United States Patent [19]
Barnett

[11] Patent Number: 5,351,566
[45] Date of Patent: Oct. 4, 1994

[54] DRIVE APPARATUS AND METHOD

[75] Inventor: Franklin E. Barnett, 4717 Freeport Way, Denver, Colo. 80239

[73] Assignees: Franklin E. Barnett, Denver; Brian D. Smith, Highlands Ranch, both of Colo.

[21] Appl. No.: 106,831

[22] Filed: Aug. 16, 1993

Related U.S. Application Data

[63] Continuation-in-part of Ser. No. 924,181, Aug. 3, 1992, Pat. No. 5,236,398.

[51] Int. Cl.$^5$ ............................................. F16H 19/04
[52] U.S. Cl. ............................................. 74/30; 74/50; 92/136; 123/197.1
[58] Field of Search ................. 74/30, 49, 50; 92/136; 123/197.1

[56]  References Cited
U.S. PATENT DOCUMENTS

| | | |
|---|---|---|
| 494,839 | 4/1893 | Berry . |
| 537,982 | 4/1895 | Keys ........................... 74/30 |
| 592,023 | 10/1897 | Schmit ......................... 74/30 |
| 1,273,693 | 7/1918 | Tucker . |
| 1,316,437 | 9/1919 | Flood .......................... 74/30 |
| 1,687,744 | 10/1928 | Webb ........................... 74/30 |
| 1,885,298 | 11/1932 | Schell .......................... 74/30 |
| 2,821,861 | 2/1958 | Dunn ............................ 74/30 |
| 3,309,110 | 3/1967 | Bulmer . |
| 3,666,292 | 5/1972 | Bartos . |
| 3,877,725 | 4/1975 | Barroza . |
| 3,994,509 | 11/1976 | Schaeffer . |
| 4,063,747 | 12/1977 | Young . |
| 4,117,915 | 10/1978 | Young . |
| 4,274,651 | 6/1981 | Dumont . |
| 4,395,977 | 8/1983 | Pahis ....................... 74/30 X |
| 4,453,729 | 6/1984 | Lucken . |
| 4,556,141 | 12/1985 | Faitel . |
| 4,573,369 | 5/1986 | Horn . |
| 4,652,026 | 3/1987 | Byrge . |
| 4,762,332 | 8/1988 | Seol . |
| 4,803,964 | 2/1989 | Kurek et al. ............... 74/30 X |
| 4,865,344 | 9/1989 | Romero, Sr. et al. . |
| 5,016,580 | 5/1991 | Gassman . |
| 5,025,756 | 6/1991 | Nye . |
| 5,062,394 | 11/1991 | Belford ................ 123/197.1 X |
| 5,076,379 | 12/1991 | Bahr et al. . |

FOREIGN PATENT DOCUMENTS

| | | | |
|---|---|---|---|
| 1939096 | 2/1971 | Fed. Rep. of Germany ......... 74/30 |
| 3306613 | 9/1984 | Fed. Rep. of Germany ........ 42/136 |

Primary Examiner—Allan D. Herrmann
Assistant Examiner—David W. Laub
Attorney, Agent, or Firm—Fields, Lewis, Pittenger, Rost & Smith

[57] ABSTRACT

Drive apparatus and method for converting linear motion to rotary motion to rotatingly drive the driveshaft of a motor vehicle are disclosed. The drive apparatus includes a sprocket rigidly connected to a shaft and axially aligned thereabout. In addition, a moveable ratch for moving between first and second drive positions and having opposing first and second linear sprocket engaging drive segments is provided. The first linear drive segment of the moveable ratch engages the sprocket when the ratch is in its first drive position and the second linear drive segment engages the sprocket when the ratch is in its second drive position. A unique dual-headed piston apparatus is also disclosed which is attached to the moveable ratch for making linear downstrokes and upstrokes to (1) facilitate movement of the ratch between its first and second drive positions at the end/beginning of each stroke and (2) drive the ratch during a stroke when the ratch is in its first or second drive position which rotates the sprocket and drives the shaft.

6 Claims, 7 Drawing Sheets

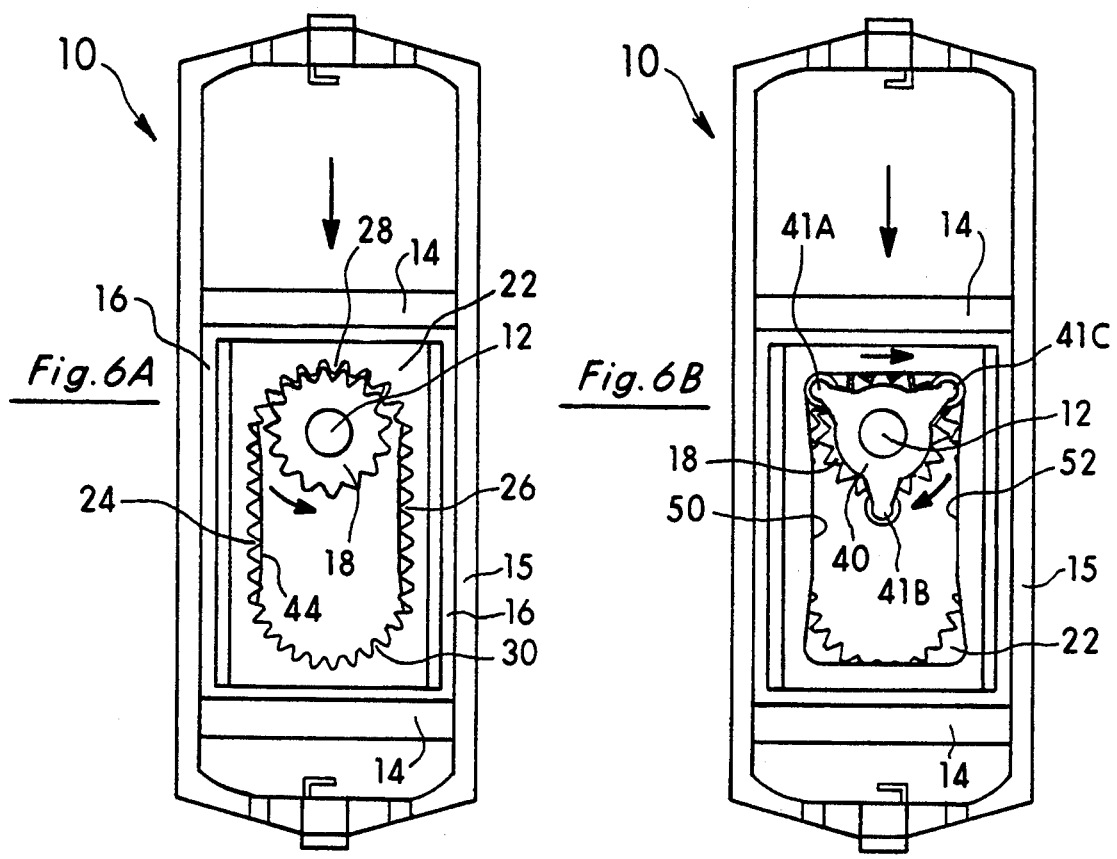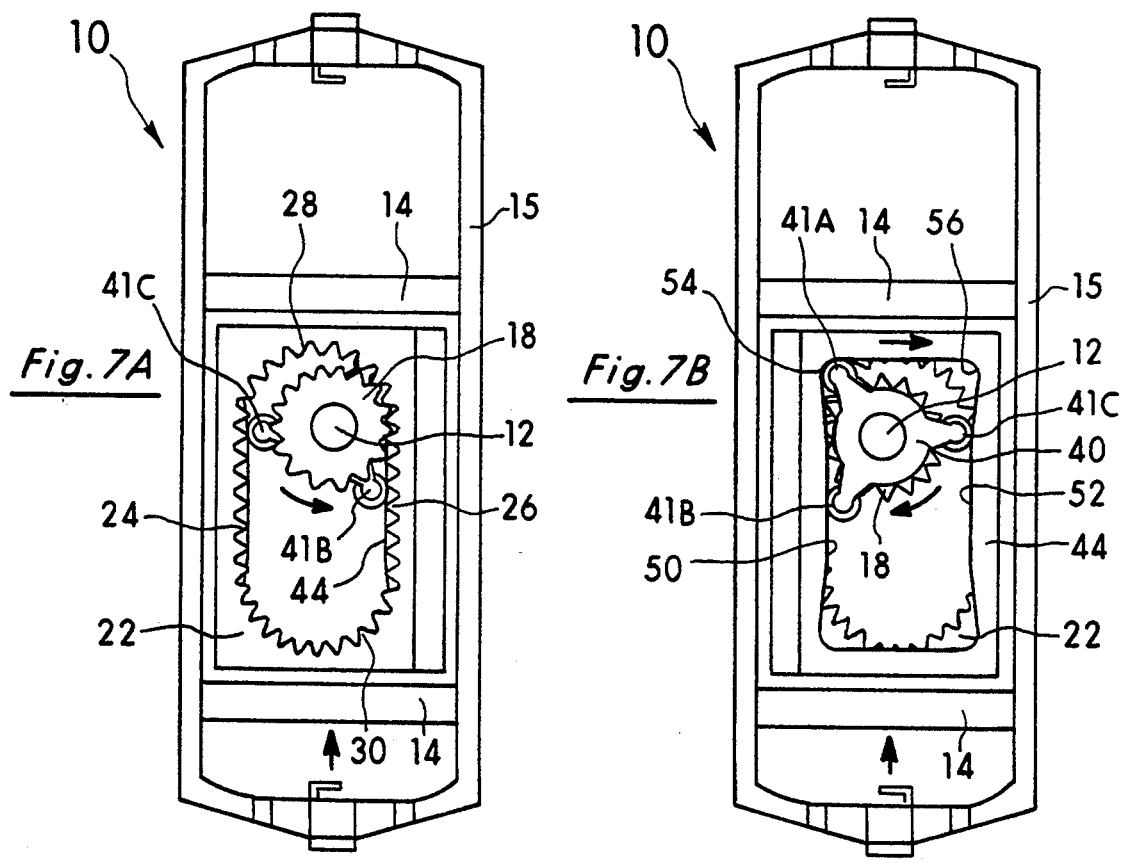

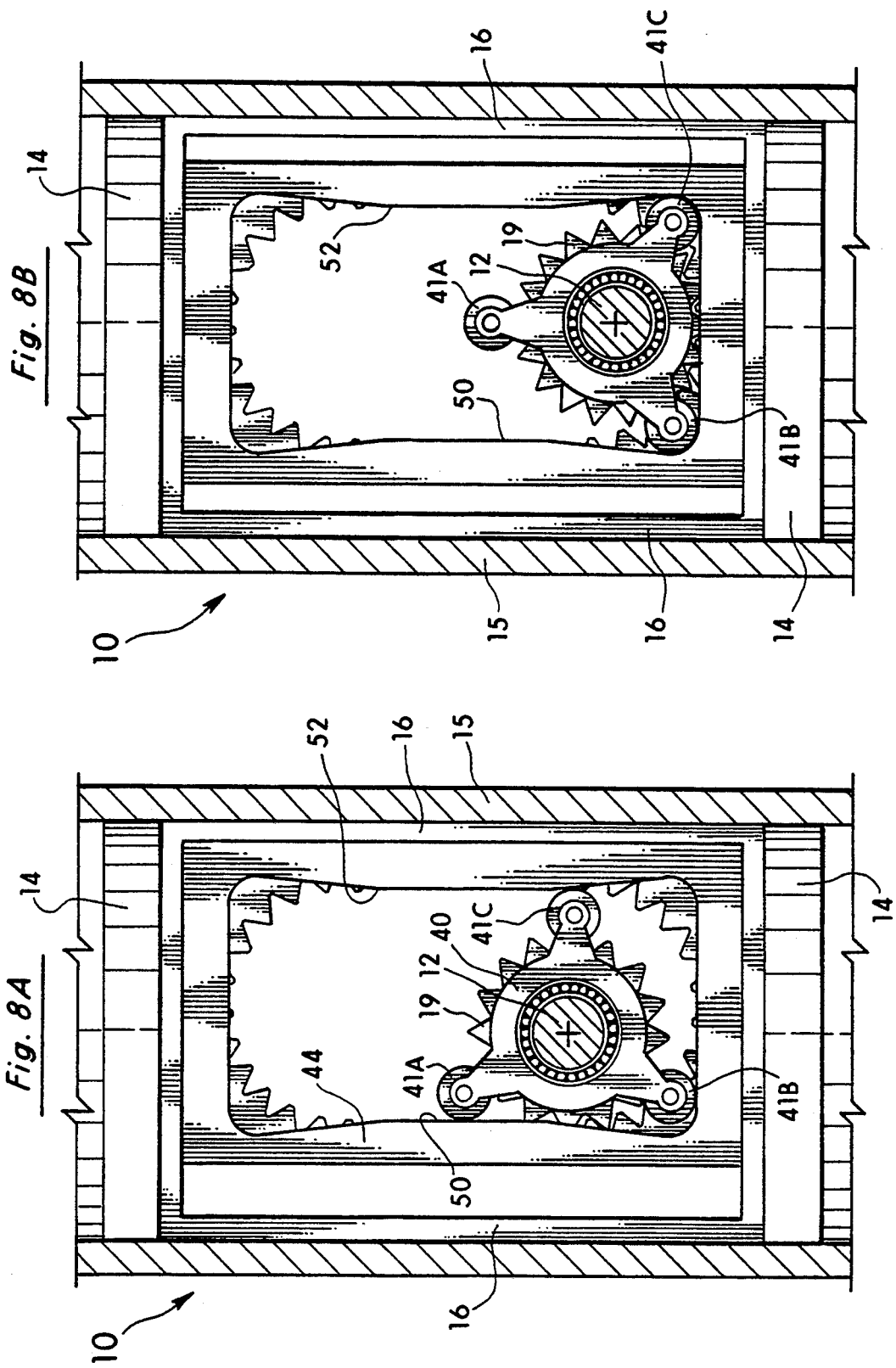

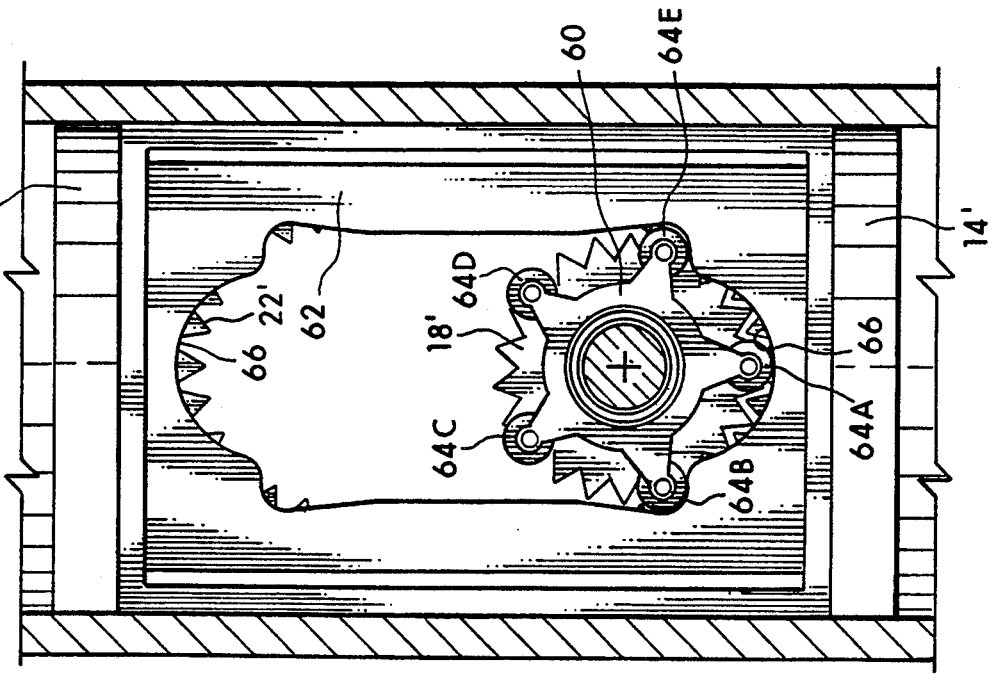
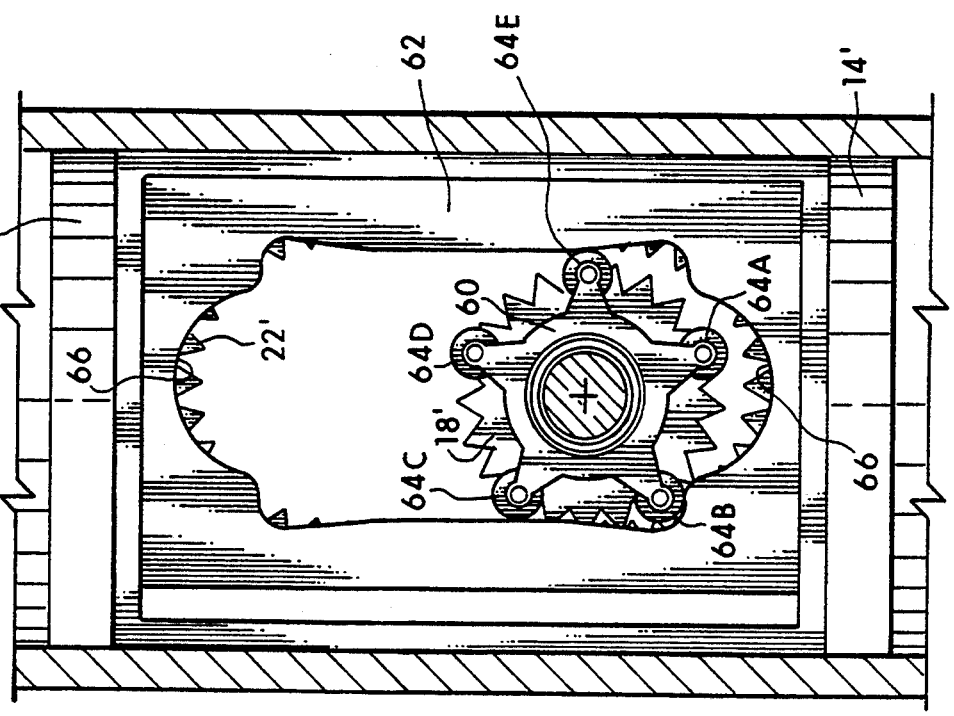

DRIVE APPARATUS AND METHOD

This application is a continuation-in-part of application Ser. No. 924,181, filed Aug. 3, 1992, now U.S. Pat. No. 5,238,398, which is hereby incorporated by reference.

TECHNICAL FIELD

The invention relates generally to method and apparatus for driving shafts and, more specifically, to a method and apparatus for driving the drive shaft of a motor vehicle powered by a piston driven internal combustion engine.

BACKGROUND OF THE INVENTION

The prior art is replete with apparatus for driving wheelchairs and bicycles. Examples of such apparatus are disclosed in U.S. Pat. Nos. 4,865,344; 4,762,332; 4,652,026; 4,453,729; 4,274,651; 4,117,915; 4,063,747; 3,994,509; 3,877,725; 3,666,292; 3,309,110; 1,273,693 and 494,839. However, there is little art known to the present inventor for driving the crankshaft or drive shaft of motor vehicles, except for that presently used in conventional piston and rotary driven engines. What little art is known is as follows: U.S. Pat. Nos. 5,076,379; 5,025,756; 5,016,580; 4,573,369 and 4,556,141.

A review of the above patents reveals that none of the apparatus disclosed therein is capable of efficiently converting linear motion to rotary motion for the purpose of driving a shaft, axle and the like. Most of the apparatus disclosed in the patents require that the operator move a handle or pedal through some sort of an arcuate or curved path in order to make a power stroke with a device. For example, in U.S. Pat. No. 3,877,725 to Barroza, it can be seen in FIG. 4 that the wheelchair is driven by moving handle 3 through the arcuate path illustrated by the arrows in FIG. 4. Similarly, in U.S. Pat. No. 4,063,747 to Young, it can be seen in FIG. 1 that the bicycle disclosed therein is powered by moving pedals 36 through an arcuate path. It will also be appreciated that the pedal of a conventional bicycle also follows an arcuate path as it revolves about the axis of the bicycle's main sprocket.

One problem with generating power along a curved or arcuate path is that the portion of the path over which maximum power can be generated is very short. For example, in a conventional bicycle, maximum power is generated during that portion of the pedal's path which travels from about +45° from the horizontal about −30° from the horizontal. As can be visualized, it is difficult to generate significant power outside this portion of the pedal's path since the operator's foot is simply not at an angle with respect to the pedal which enables the generation of much power. The connecting rod/crankshaft attached to the piston of an internal combustion engine suffers from the same problem since the mechanics of the combination are no different than that provided by the bicyclist's leg/pedal combination.

DISCLOSURE OF THE INVENTION

The present invention addresses the aforementioned problems by providing method and apparatus for efficiently converting linear motion to rotary motion to rotatingly drive an axle, drive shaft and the like. The apparatus of the present invention is ideally suited for use in piston driven internal combustion engines since it more efficiently converts the power of the piston's linear stroke to rotary motion than the connecting rod/crankshaft system presently in use.

In its broadest sense, the drive apparatus of the present invention converts linear motion to rotary motion to rotatingly drive a shaft and the like. The apparatus includes a sprocket which is rigidly connected to a shaft and axially aligned thereabout. In addition, a moveable rack or ratch means for moving between first and second drive positions and having opposing first and second linear sprocket drive engaging segments is provided. The first linear drive segment of the ratch engages the sprocket when the ratch is in its first drive position and the second linear drive segment engages the sprocket when the ratch is in its second drive position. The apparatus further includes piston means movably attached to the moveable ratch for making linear downstrokes and upstrokes, at least one of which is a powered stroke to (1) facilitate movement of the ratch between its first and second drive positions at the end/beginning of each stroke and (2) drive the ratch during a powered stroke when the ratch is in its first or second drive position to rotate the sprocket which in turn drives the shaft. While the driveshaft of a piston driven engine is the shaft which is driven in the embodiments disclosed herein, the shaft driven by the apparatus of the present invention could be the shaft of a wheelchair, bicycle or any other device.

In a preferred embodiment of the present invention the opposing first and second linear sprocket engaging segments of the moveable ratch are part of an endless racetrack-shaped ratch which continuously engages the sprocket to rotatingly drive the shaft when the ratch is in its first and second drive positions. Another preferred embodiment of the present invention includes a ratch moving means for facilitating movement of the ratch between its first and second drive positions at the end/beginning of each stroke of the piston means. The ratch moving means is preferably a triangularly-shaped or pentagonally-shaped member which is coaxially aligned with the sprocket and freely rotatable about the drive shaft. The triangular or pentagon-shaped member is received within a track rigidly attached to the moveable ratch which is specially designed to cooperate with the triangular or pentagon-shaped member to rotate the member a predetermined degree of rotation at the end/beginning of each stroke which facilitates movement of the ratch between its first and second drive positions. The member and track are also designed to cooperate with each other so that the teeth of the ratch always remain engaged with the sprocket's teeth.

Another preferred embodiment of the present invention utilizes the stroke of a unique dual-headed piston as part of the aforesaid drive apparatus of the invention to drive the drive shaft of a motor vehicle. This embodiment of the invention can also be used in reverse as a pump wherein the shaft could be driven by an electric motor which would drive the drive apparatus in reverse and thereby convert the rotary motion generated by the electric motor to linear motion. This reverse operation of the drive apparatus would drive the dual-headed piston in a reciprocating manner in its cylindrical chamber and, as such, could be used to pump fluid through the cylindrical chamber.

The method of the present invention drives an axle, shaft and the like which may be that of a bicycle, wheelchair, motor vehicle or any other similar device. The method includes the steps of providing a drive apparatus as described above and making a powered stroke with the piston means of the drive apparatus to (1) drive the ratch when it is in its first drive position so that the first linear drive segment rotates the sprocket which in turn drives the shaft and (2) facilitate movement of the ratch between its first and second drive positions at the end of each stroke of the piston means. The method may also include an additional step of making a powered return stroke with the piston means when the ratch means is in its second drive position so that the second linear drive segment rotates the sprocket means which in turn drives the shaft.

BRIEF DESCRIPTION OF DRAWINGS

The invention will be more readily understood by reference to the accompanying drawings wherein like reference numerals indicate like elements throughout the drawing figures, and in which:

FIG. 6A is a rear elevation view of the apparatus of FIGS. 5A and 5B showing the apparatus at the end of a downstroke.

FIG. 6B is a front elevation view of FIG. 6A.

FIG. 7A is a rear elevation view of the apparatus of FIGS. 5A, 5B, 6A and 6B showing the apparatus as it would appear at the beginning of an upstroke.

FIG. 7B is a front elevation view of FIG. 7A.

FIG. 8A is an enlarged partial front elevation view of the drive apparatus of FIG. 1 showing the triangular member as it would appear just prior to completing an upstroke.

FIG. 8B is an enlarged partial front elevation view similar to FIG. 8A showing, however, the triangular member as it would appear momentarily at the end of an upstroke.

FIG. 9A is an enlarged front elevation view similar to FIG. 8A showing, however, a different embodiment of the present invention which utilizes a pentagon-shaped member to facilitate movement of the apparatus's moveable ratch. FIG. 9A illustrates the apparatus as it would appear near the end of an upstroke.

FIG. 9B is an enlarged partial front elevation view similar to that of FIG. 9A showing, however, the pentagon-shaped member as it would appear momentarily at the end of an upstroke.

DETAILED DESCRIPTION OF PREFERRED EMBODIMENTS

Figure 1:
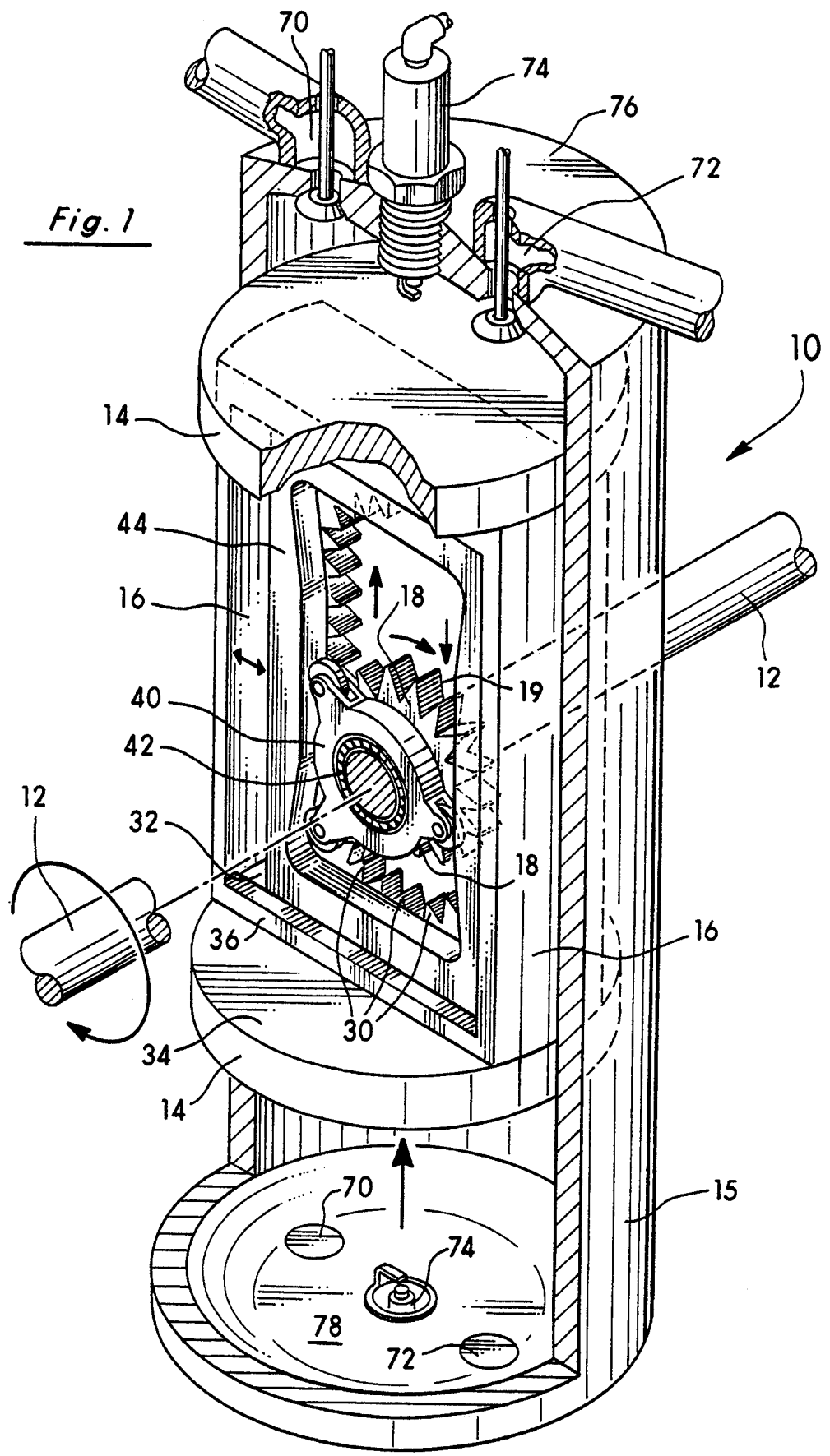
FIG. 1 is a perspective view of a drive apparatus of the present invention for converting linear motion to rotary motion to drive a shaft. The straight upwardly pointing arrows of this figure indicate the direction in which the piston heads and attached apparatus are moving. The curved arrows indicate the direction in which the shaft and sprocket attached to the shaft are rotating. The double-headed arrow indicates that track 44 and attached ratch 22 are capable of side-to-side lateral movement in track 32.
Figure 2:
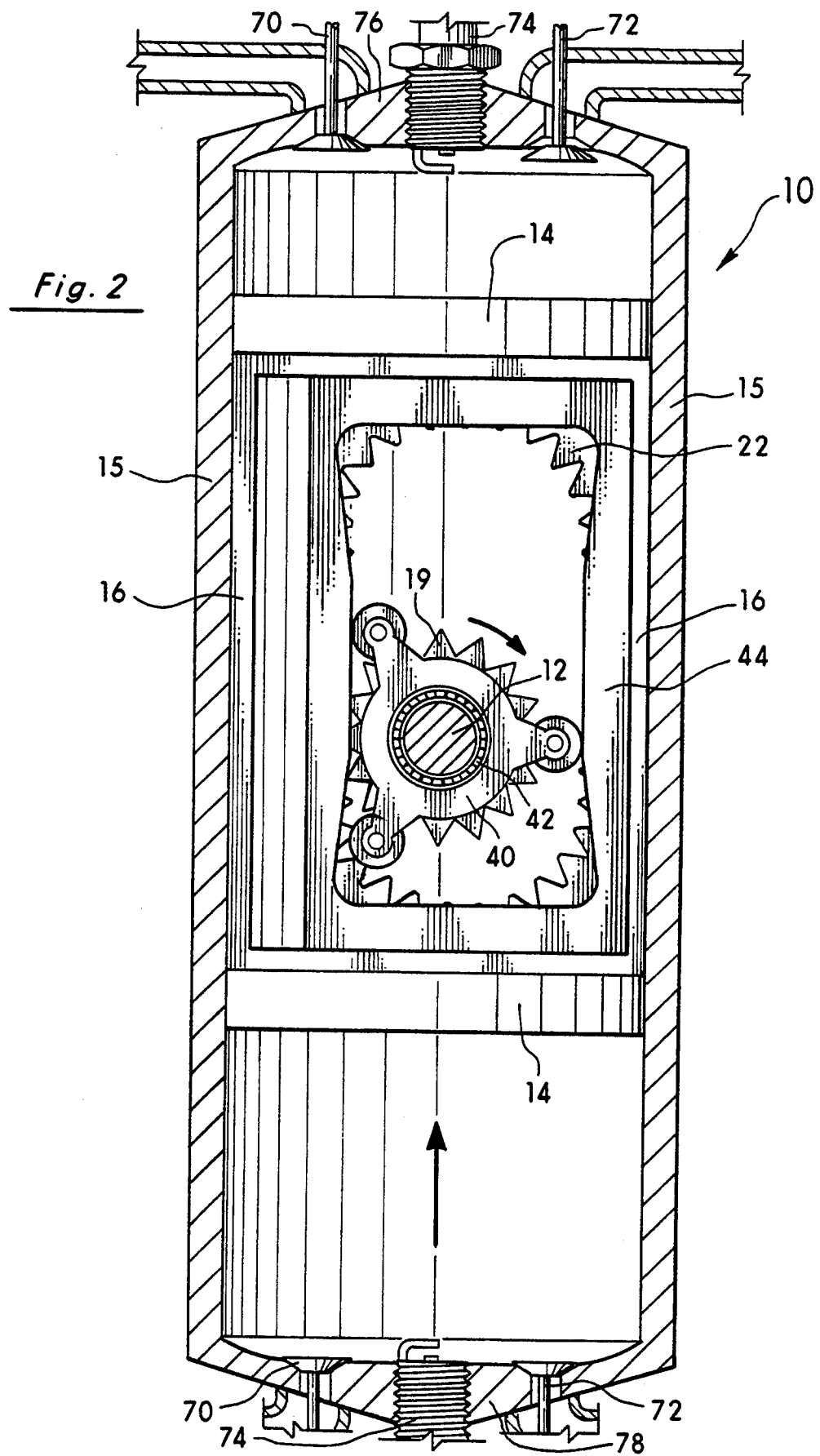
FIG. 2 is a front elevation view of the apparatus illustrated in FIG. 1.

FIGS. 1 through 8A and 8B illustrate a drive apparatus 10 of the present invention for driving the driveshaft 12 of a motor vehicle. The apparatus converts the energy of the linear downstrokes and upstrokes made by a pair of connected piston heads 14 to rotary motion to rotatingly drive driveshaft 12.

The piston heads 14 are connected by a pair of opposing connecting rods 16 and housed within a cylindrical chamber 15 which is similar to that found in most internal combustion engines with the exception that the cylinder is provided with intake and exhaust ports 70, 72 respectively, and spark plugs 74 at both of its ends 76 and 78. This enables the combination to be powered during both its downstroke and upstroke which is easily accomplished by properly timing the firing of the spark plugs located in ends 76 and 78 of the chamber. The timing and firing of the spark plugs can be done in any conventional manner known to those skilled in the relevant art.

Figure 3:
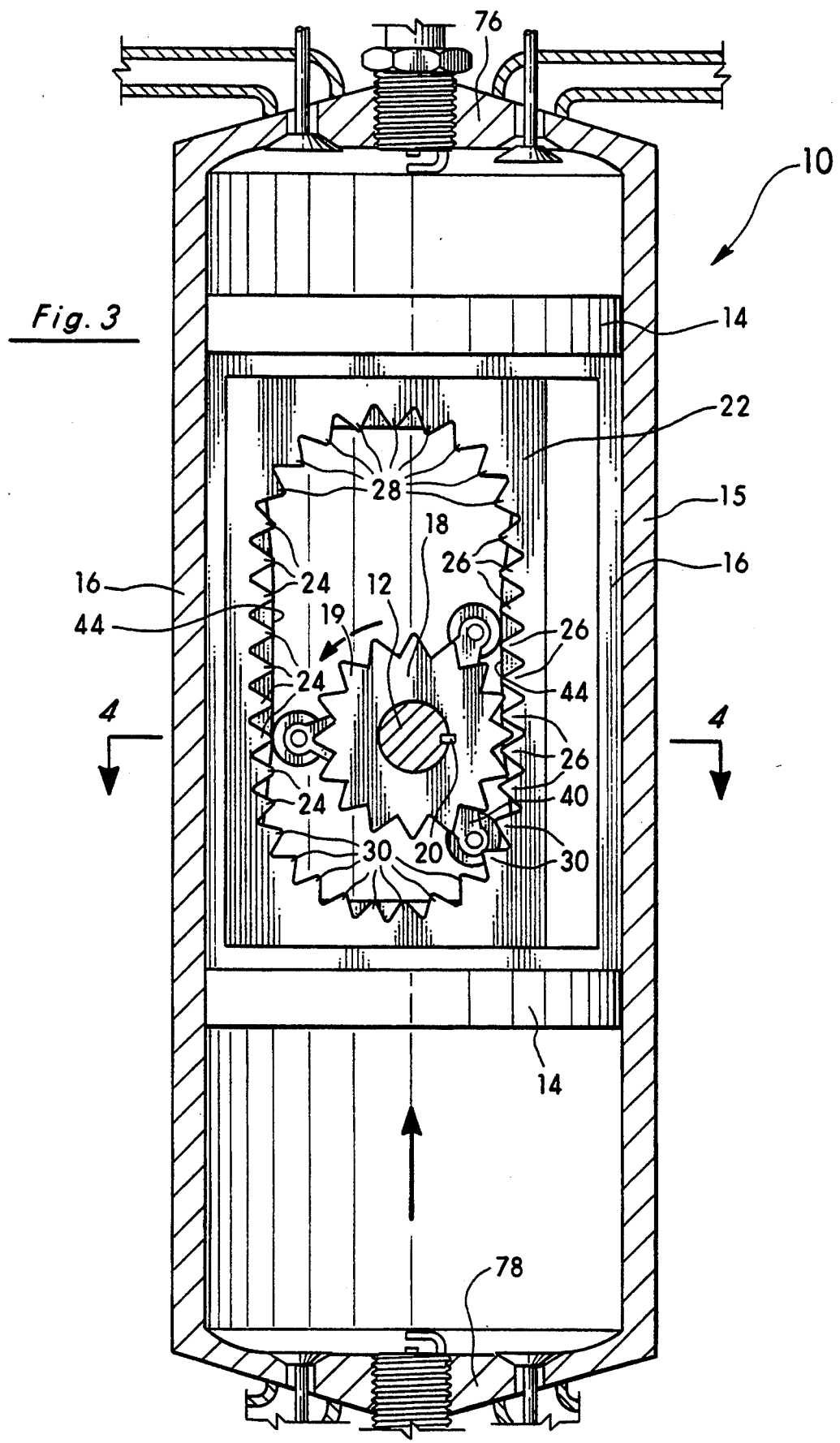
FIG. 3 is a rear elevation view of the apparatus illustrated in FIG. 1.
Figure 4:
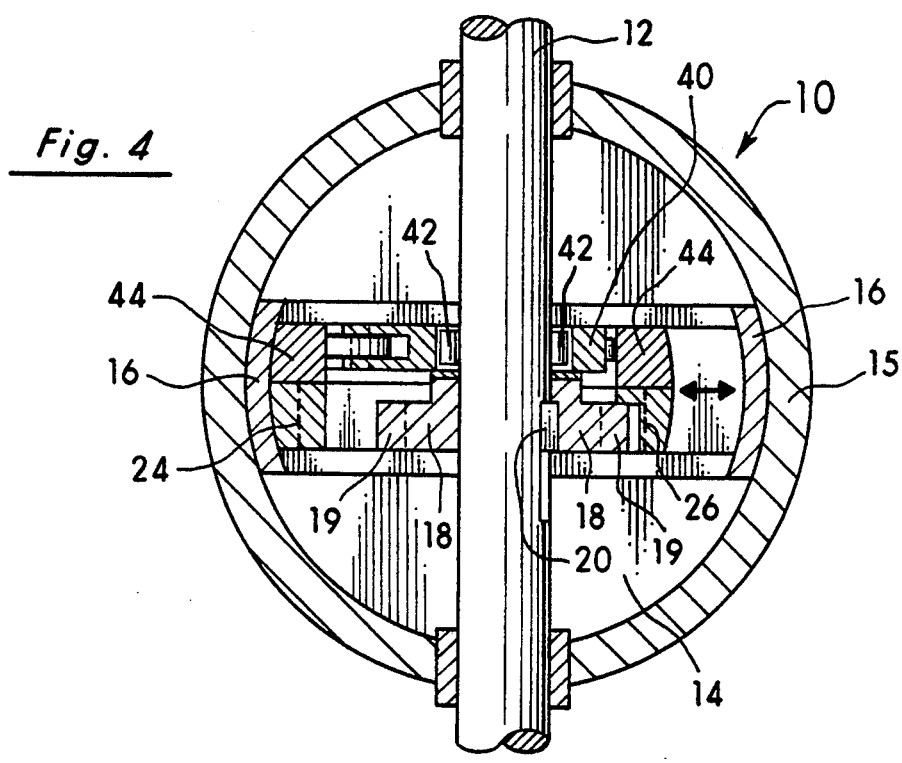
FIG. 4 is a cross-sectional view taken along lines 4—4 of FIG. 3. The illustrated double-headed arrow indicates that track 44 and attached ratch 22 are capable of side-to-side lateral movement.

Turning now to the components of apparatus 10 which convert the pistons' linear motion to rotary motion, it can be seen in FIGS. 1 and 3 that driveshaft 12 is connected to a sprocket 18 which is axially aligned about the driveshaft and rigidly connected thereto by a key 20. As also illustrated, sprocket 18 has teeth 19 which are engaged by those of a moveable ratch or rack 22 having an endless racetrack shape. The racetrack shape provides the endless ratch with opposing first and second sprocket engaging drive segments which are linear and which are identified, respectively, by their teeth 24 and 26. (See FIG. 3) As also illustrated, linear segments 24, 26 are joined at their ends by opposing half circular-shaped sprocket engaging segments which are also respectively identified by their teeth 28 and 30.

Figure 5A:
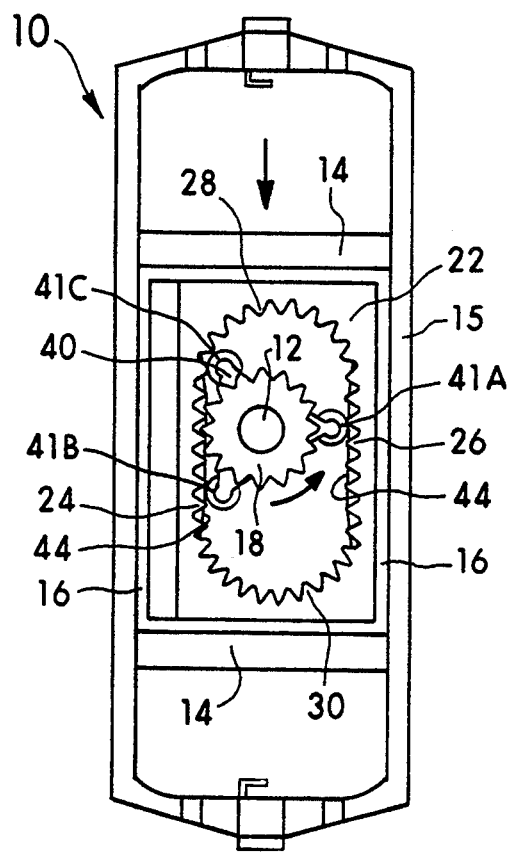
FIG. 5A is a rear elevation view similar to that of FIG. 3 showing the position of the sprocket and triangular member during a downstroke of the piston means.

As will be appreciated from FIGS. 5A and 7A, when the connected pair of piston heads 14 is making a downstroke as illustrated in FIG. 5A, sprocket 18 is driven counter-clockwise by linear segment 24 of endless ratch 22. In addition, when the connected pair of piston heads 14 is making an upstroke as indicated by the arrow in FIG. 7A, sprocket 18 is driven, i.e. engaged and rotated by the opposing linear segment 26 which continues rotation of sprocket. 18 in the illustrated counterclockwise direction.

FIG. 6A illustrates sprocket 18 engaging the central area of half-circular segment 28 which is a position ratch 22 travels through very quickly at the end of a downstroke. To move from the first linear drive position of ratch 22 illustrated in FIG. 5A to the second linear drive position of ratch 22 illustrated in FIG. 7A, the half-circular shaped segment 28 of ratch 22 must travel over sprocket 18 from linear segment 24 to linear segment 26. As will be appreciated, it is the momentum of rotating sprocket 18 and shaft 12 (which is generated when the endless ratch drives sprocket 18 during the piston's upstrokes and downstrokes) which carries ratch 22 in effect driving it so that it moves from its first drive position (i.e. right side) depicted in FIG. 5A to its second position (i.e. left side) illustrated in FIG. 7A. As will be appreciated, the direction of ratch 22's movement is perpendicular to the direction of the piston's downstrokes and upstrokes. While not illustrated, those skilled in the art will appreciate that a conventional flywheel can be rigidly attached to drive shaft 12 to increase the momentum of rotating sprocket 18 and driven shaft 12 to further enhance movement of ratch 22 between its first and second drive positions at the end/beginning of each stroke of piston heads 14.

Movement of ratch 22 between its first and second drive positions illustrated in FIGS. 5A and 7A is enhanced by tracks 32 which are attached to the underside surfaces 34 of piston heads 14 and which receive the ratch's top and bottom edges (not numbered). Each track 32 is defined by cross members 36 of the opposing pair of connecting rods 16 which connect the pair of piston heads 14. While not shown, bearings of some sort, preferably roller bearings, could be provided in the top and bottom edges of ratch 22 which would ride in track 32 and facilitate perpendicular movement of the ratch between its first and second drive positions.

The aforedescribed components of drive apparatus 10 are believed to provide everything necessary to convert the piston heads' linear downstrokes and upstrokes to rotary motion to rotatingly drive shaft 12. However, to insure that the conversion occurs and to insure that ratch 22 remains engaged with sprocket 18 and moves between its first and second drive positions at the end/beginning of each stroke, drive apparatus 10 is preferably provided with an equilateral triangularly-shaped ratch moving means or member 40 which is received in and guided by an endless bone-shaped guide means or guide track 44. As illustrated, triangular member 40 is coaxially aligned with sprocket 18 and mounted about the shaft with bearing means 42 so that it is freely rotatable about shaft 12 (see FIG. 2). In contrast, guide track 44 is rigidly connected to endless ratch 22. Thus, track 44 will move with endless ratch 22 as it moves between its first and second linear drive positions at the end/beginning of each stroke of piston heads 14.

Figure 5B:
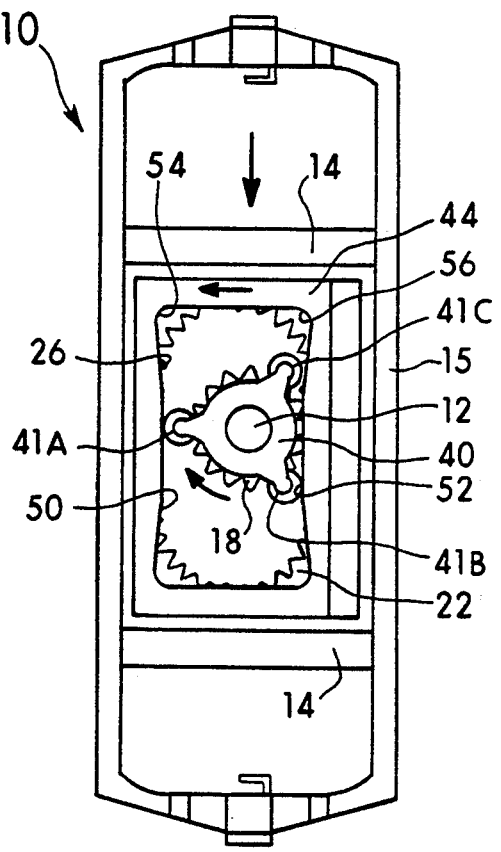
FIG. 5B is a front elevation view of the apparatus depicted in FIG. 5A.

In accordance with an important aspect of the present invention, bone-shaped track 44 cooperates with the triangular member 40 to rotate member 40 one-sixth of a turn, i.e. 60° at the end/beginning of each stroke which facilitates movement of ratch 22 between its first and second drive positions. FIGS. 5B, 6B and 7B illustrate this 60° rotation of the triangular-shaped member 40.

FIG. 5B provides a front elevation view of drive apparatus 10 which, as previously mentioned, illustrates piston heads 14 in the process of making a downstroke in which linear drive segment 24 is engaging sprocket 18 to rotate the sprocket in a counterclockwise direction as viewed from the rear elevation views of FIGS. 5A and 7A. As also illustrated, a roller bearing 41A of member 40 attached to a corner of member 40 is riding against a side 50 of track 44 while roller bearings 41B and 41C attached to the other corners of member 40 ride against the opposite side 52 of track 44. The horizontal arrow pointing to the left in FIG. 5B indicates that track 44 and attached ratch 22 have slid to the left side of track 32 as such is depicted in FIG. 5B. FIG. 6B illustrates the position of triangular member 40 after it has begun to rotate in a clockwise direction as depicted from the perspective of FIGS. 5B, 6B and 7B. The rotation is produced by the downward movement of track 44 which causes roller bearing 41A to roll against side 50 of track 44 into the upper left dog-boned portion 54 of track 44. This movement occurs at the end of the downstroke when roller bearing 41C moves into dog-boned section 56 of track 44 which opposes dog-boned section 54. As this movement is occurring, it can be seen that roller bearing 41B pivots away from side 52 of track 44 to the position illustrated in FIG. 6B. It can also be seen as indicated by the horizontal arrow pointing to the right in FIG. 6B that track 44 and attached ratch 22 are moving to the right (as such is depicted in FIG. 6B) as triangular member 40 is rotating.

FIG. 7B illustrates the remaining rotation of triangular member 40 which occurs as piston heads 14 begin their upstroke. As illustrated, the now upward movement of track 44 causes triangular member 40 to continue rotating in a clockwise direction until roller bearing 41C moves out of dog-boned section 56 of track 44 to its position illustrated in FIG. 7B against side 52. It will be appreciated that the rotation of member 40 also moves or facilitates movement of track 44 and attached ratch 22 sideways, i.e. perpendicular to the linear direction of the pistons' 14 strokes which causes linear segment 26 to engage the sprocket so that ratch 22 is in its second drive position for driving sprocket 18 during the pistons' upstroke. Triangular member 40, as illustrated in FIG. 7B, is also in the position it stays in during the pistons' upstroke until the end of the upstroke is reached at which point it will rotate another 60°. The second drive position of ratch 22 and attached track 44 is illustrated by the horizontal arrow pointed to the right in FIG. 7B wherein it can been seen that ratch 22 and attached track 44 have slid to the far right side of the apparatus as such is depicted in FIG. 7B.

FIG. 8A illustrates the position of triangular member 40 and track 44 near the end of the pistons' upstroke just prior to rotation of member 40. FIG. 8B illustrates the position of triangular member 40 at the complete end of the upstroke where it can be seen that it has rotated approximately 30° of the 60° it will rotate in moving ratch 22 from its second drive position to its first drive position. It will also be appreciated that ratch 22 has moved halfway between its linear drive positions at this point as indicated by the distances identified by the letter C which as illustrated are relatively equal. When triangular member 40 completes one-sixth of a turn, i.e. 60° rotation, roller bearing member 41A of member 40 will pivot to the right until it contacts side 52 of track 44. This position is illustrated in FIG. 5B, with the only difference being that bearings 41A and 41C will engage side 52 of track 44 as opposed to roller bearings 41B and 41C illustrated in FIG. 5B. It will also be appreciated that during rotation of triangular member 40 as described, ratch 22 moves perpendicularly to the left so that its linear segment 24 (see FIG. 5A) is engaging the sprocket and in position to drive the sprocket during the pistons' downstroke.

In accordance with an important aspect of the present invention, ratch 22 must move perpendicularly, i.e. from its first drive position to its second drive position a distance at least equal to the depth to which teeth 19 of the sprocket engage the teeth of ratch 22. If the ratch does not move this distance, both the first and second linear segments 24, 26 will remain engaged with the sprocket, thereby preventing its rotation.

FIGS. 5A and 8A illustrate that triangular member 40 has a height (as measured from a line tangent to the side surfaces of two roller bearings 41 such as bearings 41A and 41B in FIG. 8A to the far surface of the other bearing such as bearing 41C) which is equal to the cross-width of the track as measured between sides 50 and 52 of track 44 at their central sections. By providing member 40 with such a height, triangular member 40 maintains the teeth of the driving linear segment 24 or 26 in engagement with teeth 19 of sprocket 18 during their designated drive strokes. This engagement also helps to maintain the sprocket's teeth in engagement with the teeth of the ratch's half-circular segments 28, 30 as the momentum of the sprocket (and shaft) move, actually drive the ratch from one drive position to its other drive position at the end/beginning of each stroke.

FIGS. 9A and 9B illustrate another embodiment of the present invention which is identical to that illustrated in FIGS. 1 through 8B with the exception that this embodiment has a pentagon-shaped member 60 replacing triangular member 40 and a differently-shaped track 62 (replacing track 44). Track 62 is shaped differently than track 44 so that it cooperates with pentagon-shaped member 60 to rotate it one-tenth of a turn, i.e. 36°, at the end/beginning of each piston stroke.

Pentagon-shaped member 60 has a regular pentagon shape with five equal angles and five equidistant corners (not numbered) which are provided with roller bearings 64A, B, C, D and E. As illustrated, pentagon-shaped member 60 is received within track 62 and cooperates therewith to facilitate movement of ratch 22' between its first and second drive positions. (The components of this embodiment which are identical to those of the previous embodiment are numbered the same except for the prime designation.) It will be appreciated that the height of the pentagon-shaped member (as measured between a line tangent to two adjacent roller bearings such as bearings 64B and C of FIG. 9A and the far edge of the oppositely facing bearing such as bearing 64E which is equidistant from the two adjacent roller bearings) is equal to the cross-width of the track. As with the previous embodiment, this height maintains the teeth of the driving linear drive segment of ratch 22' in engagement with the teeth of the sprocket during a drive stroke of the connected pistons. Track 62 is also provided with opposing ends 66 which are sized and configured to cooperate with pentagon-shaped member 60 to facilitate its rotation 36° at the end/beginning of each stroke and maintain the ratch's engaged half circular segments in engagement with sprocket 18' to facilitate perpendicular movement of ratch 22' from one drive position to its other drive position.

From the foregoing description, those skilled in the art will appreciate that the present invention converts substantially all of the energy of the linear motion of the piston heads to rotary motion, thereby providing a system which is much more efficient than that provided by conventional drive apparatus for driving a vehicle's crankshaft or driveshaft. Those skilled in the fuels art will also appreciate that unlike conventional piston or rotary engines which require relatively high octane fuel, the dual-headed piston apparatus of the present invention can operate quite efficiently on lower octane fuels.

In addition, with the dual piston head apparatus of the present invention, it is possible to reduce the size of an internal combustion engine block by more than 30 percent, thereby reducing the weight of the engine block by 30 percent or more. The present invention also replaces the conventional crankshaft of a piston engine with a straight driveshaft which, when combined with the dual piston head apparatus of the present invention will be much shorter than a conventional crankshaft. The driveshaft of the present invention will also be much less expensive to manufacture than conventional crankshafts due to the fact that it is not comprised of a series of lever arms which require expensive tooling. Finally, it will be appreciated that the invention increases the efficiency of power transfer and thus fuel economy due to the fact that substantially all energy of the piston's linear motion is converted to rotary motion to rotatingly drive the driveshaft. With such increased efficiency, horsepower increases of 30 percent or more are believed to be possible.

The invention has been described in detail with reference to particular embodiments thereof, but it will be understood that various other modifications can be effected within the spirit and scope of this invention.

What is claimed is:

1. A drive apparatus comprising:

sprocket means rigidly connected to a shaft and axially aligned thereabout;

an endless racetrack-shaped ratch means for continuously engaging said sprocket means and moving between first and second linear drive positions, said ratch means having opposing first and second linear segments wherein said first linear segment engages said sprocket means when said ratch means is in its first linear drive position and wherein said second linear segment engages said sprocket means when said ratch means is in its second linear drive position, said first and second opposing linear sprocket engaging drive segments being joined at their ends by a pair of opposing half circular-shaped sprocket engaging segments to provide said ratch means with its racetrack shape;

ratch moving means for facilitating movement of said ratch means between its first and second linear drive positions and maintaining said ratch means in engagement with said sprocket means, said ratch moving means including an equilateral triangularly-shaped member which is coaxially aligned with said sprocket means and freely rotatable about the shaft;

means attached to said ratch means for transmitting the energy of linear motion to and from said ratch means by enabling reciprocating strokes to be made with said ratch means such that (1) when a stroke is made in a generally linear predetermined first direction said first linear segment of said ratch means engages said sprocket means and (2) when a stroke is made in a generally linear second direction which is opposite that of the linear first direction said second linear segment engages said sprocket means; and guide means rigidly connected to said ratch means, said guide means defining a track for receiving and cooperating with said triangularly-shaped member to (1) rotate said triangularly-shaped member one-sixth of a turn at the end/beginning of each stroke and (2) maintain said sprocket means engaged with said half-circular segments of said ratch means as said ratch means moves between the first and second positions at the end/beginning of each stroke, said track also having a cross-width which is substantially equal to the height of said triangularly-shaped member so that said triangularly-shaped member and track cooperate to maintain said ratch means in engagement with said sprocket means when said ratch means is in its first or second drive position.

2. A drive apparatus as claimed in claim 1 wherein each of the three corners of said triangularly-shaped member are provided with bearing means for engaging said track and for cooperating therewith to facilitate said one-sixth of a turn rotation of said triangular member at the end/beginning of each stroke.

3. A drive apparatus as claimed in claim 2 wherein said bearing means is a roller bearing.

4. A drive apparatus comprising:

sprocket means rigidly connected to a shaft and axially aligned thereabout;

an endless racetrack-shaped ratch means for continuously engaging said sprocket means and moving between first and second linear drive positions, said ratch means having opposing first and second linear segments wherein said first linear segment engages said sprocket means when said ratch means is in its first linear drive position and wherein said second linear segment engages said sprocket means when said ratch means is in its second linear drive position, said first and second opposing linear sprocket engaging drive segments being joined at their ends by a pair of opposing half circular-shaped sprocket engaging segments to provide said ratch means with its racetrack-shape;

ratch moving means for facilitating movement of said ratch means between its first and second drive positions and maintaining said ratch means in engagement with said sprocket means while it is in its first or second drive position, said ratch moving means including a pentagonally-shaped member having five equal angles and five equidistant corners which is coaxially aligned with said sprocket means and freely rotatable about the shaft;

means attached to said ratch means for transmitting the energy of linear motion to and from said ratch means by enabling reciprocating strokes to be made with said ratch means such that (1) when a stroke is made in a generally linear predetermined first direction said first linear segment of said ratch means engages said sprocket means and (2) when a stroke is made in a generally linear second direction which is opposite that of the linear first direction said second linear segment engages said sprocket means; and guide means rigidly connected to said moveable ratch means, said guide means defining a track for receiving said pentagonally-shaped member and cooperating therewith to (1) rotate said pentagonally-shaped member one-tenth of a turn at the end/beginning of each stroke and (2) maintain said sprocket means engaged with said half-circular segments of said endless ratch means as said ratch means moves between its first and second drive positions at the end/beginning of each stroke, said pentagonally-shaped member also having a height which is substantially equal to the cross-width of said track so that said member and track cooperate to maintain said ratch means in engagement with said sprocket means when said ratch means is in its first or second drive position.

5. An apparatus as claimed in claim 4 wherein said track has ends which are sized and configured to cooperate with said pentagonally-shaped member to facilitate said one-tenth of a turn rotation of said member at the end/beginning of each stroke and maintain said sprocket means engaged with said half-circular segments of said ratch means to facilitate movement of said ratch means between its first and second drive positions at the end/beginning of each stroke.

6. A drive apparatus as claimed in claim 5 wherein each of the five corners of said pentagonally-shaped member are provided with bearing means for engaging said track and for cooperating therewith to facilitate said one-tenth of a turn rotation of said member at the end/beginning of each stroke.

* * * * *